United States Patent [19]
Craun et al.

[11] Patent Number: 5,290,828
[45] Date of Patent: Mar. 1, 1994

[54] AQUEOUS DISPERSED ACRYLIC GRAFTED EPOXY POLYESTER PROTECTIVE COATINGS

[75] Inventors: Gary P. Craun, Berea; Daniel Bode; Denise E. Yancey, both of Cleveland, all of Ohio

[73] Assignee: The Glidden Company, Cleveland, Ohio

[21] Appl. No.: 75,398

[22] Filed: Jun. 11, 1993

[51] Int. Cl.$^5$ .................. C08G 59/16; C08G 63/76; C08K 3/20
[52] U.S. Cl. ...................................... 523/423; 525/438
[58] Field of Search .................... 523/423; 525/438

[56] References Cited

U.S. PATENT DOCUMENTS

| | | | |
|---|---|---|---|
| 3,621,093 | 11/1971 | Svoboda et al. | 525/438 |
| 4,013,614 | 3/1977 | Self | 523/521 |
| 4,028,294 | 6/1977 | Brown et al. | 523/423 |
| 4,293,659 | 10/1981 | Svoboda | 523/500 |
| 4,444,923 | 4/1984 | McCarty | 523/423 |
| 4,564,648 | 1/1986 | Huybrechts et al. | 523/423 |

*Primary Examiner*—Robert E. Sellers
*Attorney, Agent, or Firm*—Thomas M. Schmitz

[57] ABSTRACT

An aqueous dispersed, low VOC coating containing a polymeric binder comprises an addition copolymer grafted epoxy polyester terpolymer. The graft terpolymer comprises by weight between 1% and 70% unsaturated polyester, 5% and 80% epoxy resin, and 5% and 70% addition copolymer, where the terpolymer has an Acid Number above about 30 and is dispersed into water with a volatile base.

11 Claims, No Drawings

AQUEOUS DISPERSED ACRYLIC GRAFTED EPOXY POLYESTER PROTECTIVE COATINGS

This invention pertains to aqueous dispersed acrylic grafted epoxy and polyester interpolymers particularly useful as polymeric binders for protective surface coatings applied to a substrate and particularly can coatings for beverages and foods.

BACKGROUND OF THE INVENTION

Industrial coatings are surface protective coatings (paint coatings) applied to substrates and typically heat cured to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof.

Container coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then reduced with water by a direct or inverse let down procedure. Although cured film properties are highly desirable, such coatings suffer from the fact that sizeable amounts of solvent are required to obtain good performance. High molecular weight epoxy resins typically require 25% to 50% solvent (based on total solids plus organic solvent) before reducing with amine and water.

Epoxy based can coatings comprising a carbon grafted acrylic chain produced in the presence of an extender resin are disclosed in U.S. Pat. No. 4,399,241 and U.S. Pat. No. 4,482,671 while U.S. Pat. No. 4,595,716, and U.S. Pat. No. 5,157,078 teach a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water whereby the aqueous polymer dispersion typically produces a VOC (volatile organic compounds) level considerably above 2 lbs. per gallon VOC and typically between 3 and 4 VOC levels.

It now has been found that organic solvent can be substantially reduced or even eliminated from epoxy copolymer coatings by producing a graft epoxy copolymer in conjunction with a grafted unsaturated polyester and copolymerized ethylenic monomers to produce an acrylic grafted epoxy-polyester interpolymer. The unsaturated polyester functions as a non-volatile solvent for the epoxy resin during processing but contains minimal double bonds to enable the polyester to eventually coreact with copolymerizing ethylenic monomers and produce an acrylic grafted polyester. The epoxy esterifies with carboxyl functional monomer and/or undergoes hydrogen abstraction during addition polymerization to produce the epoxy graft. The epoxy, polyester, and acrylic addition polymer form a terpolymer interconnected by polymeric crosslinks to enable good compatibility of the hybrid polymer structures, subsequently dispersed into water while minimizing the need for volatile organic solvents. The resulting water dispersed polymers exhibit long term stability and are particularly useful as interior coatings for beer, beverage and food containers. Food container coatings must resist different types of acidic foods and ordinarily require high molecular weight resins which in turn inherently require higher levels of organic processing solvents.

It has been found that the interior can coatings of this invention exhibit excellent wetting and water resistance properties and can be made at very low VOC's by grafting ethylenic monomers with a blend of epoxy and polyester resins. Very low VOC coatings can be made by the process of this invention. It has been found that polyester resins (about 200 to 20,000 number average molecular weight) can be used to dissolve high molecular weight epoxy resins and can effectively replace most if not all of the organic volatile solvent ordinarily required for processing high molecular weight epoxy resins. Ethylenic monomers grafted onto both the epoxy resin and the polyester form a three way graft terpolymer that exhibits excellent stability and coating properties. The polyester resin greatly improves the processability of the epoxy resin without detracting from film properties such as gloss, clarity, and water resistance. An added advantage of this invention is lower cost because most polyester resins are less expensive than epoxy resins, while the cost of organic solvent is reduced or eliminated. The use of flexible polyesters in combination with epoxy and acrylic, particularly where the polyester is grafted onto the acrylic backbone by virtue of an unsaturated graft site, contributes to a lower viscosity and allows the removal of organic solvent to achieve VOC's well below 2 lbs/gal and advantageously below 1 lbs/gal. This polyester modified system has excellent formability and resistance to food storage, and also has advantages over the current state of the art in application and cleanup. These and other advantages of this invention will become more apparent by referring to the detailed description and illustrative examples.

SUMMARY OF THE INVENTION

Briefly, the invention pertains to an aqueous dispersed protective coating composition containing a polymeric binder comprising an epoxy resin and a polyester grafted with in-situ copolymerized ethylenic monomers including carboxyl monomers to produce an acrylic grafted epoxy-polyester interpolymer. The polyester contains minimal amounts of double bond unsaturation for addition copolymerization with ethylenic monomers while carboxyl functional ethylenic monomers ester graft with available oxirane groups on the epoxy resin to form the interpolymer. The grafted epoxy polyester polymers are produced by in-situ copolymerization of ethylenic monomers at temperatures above about 130° C. and at levels of initiator below about 10% by weight based on monomer.

DETAILED DESCRIPTION OF THE INVENTION

The invention is directed to coatings containing a polymeric binder comprising epoxy resin and polyester grafted with copolymerized ethylenic monomers.

Referring first to epoxy resins, useful epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The preferred linear epoxy resins are polyglycidyl ethers of bisphenol-A having terminating 1,2-epoxide groups (oxirane groups) and an epoxy equivalent weight between 140 and 525, and a number average molecular weight from about 280 to 10,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); EPON 1001 (1050); EPON 1007F (4000); and Ciba-Geigy linear epoxy resins GT-7013 (1400); GT-7014 (1500); GT-7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

Particularly preferred epoxy resins include all of the commercial higher molecular weight resins such as EPON 1009, 1007, 1004, and the like, as well as resins which are prepared by the advancement of excess equivalents of liquid epoxy resins with lesser equivalents of bisphenol A to produce predominantly oxirane group terminated epoxy resins preferably having a number average molecular weight between about 1,000 and 10,000.

Referring next to the polyester, useful polyesters generally comprise esterification of dicarboxylic acids with diols to produce essentially linear polyester polymers although minor amounts of branching due to trifunctional components is acceptable. Suitable linear saturated dicarboxylic acids have between 1 and 10 linear carbon atoms such as adipic, azelaic, succinic, glutaric, pimelic, subercic or sebacic acid to produce low molecular weight polyesters. Aromatic dicarboxylic acids (anhydrides) include phthalic, isophthalic, terephthalic, and tetrahydrophthalic. Suitable glycols include linear aliphatic glycols having 2 to 8 carbon atoms such as ethylene glycol, 1,3 or 1,4 butylene glycol, 1,6 hexane diol, neopentyl glycol, propylene glycol, diethylene or dipropylene glycols, and similar linear glycols. Very minor amounts of triols such as trimethylol propane, and trimethylol ethane, and other polyols such as pentaerythritol can be included. Particularly useful polyesters can be prepared from any of the common dicarboxylic acids, such as adipic acid, isophthalic acid, phthalic acid, dodecanedioic acid, sebacic acid and the like, with lesser amounts of monobasic acids if desired, such as benzoic acid, and 2-ethylhexanoic acid. In accordance with this invention, very little amounts (indicated hereafter) of unsaturated diacids that contain carbon-carbon unsaturation, such as maleic acid, fumaric acid, or itaconic are desirable, as they render the polyester to grafting with the acrylic monomers. Preferred polyesters can be prepared at about 200 to 20,000 Mn, but number average molecular weights of about 1,000 to 10,000 are preferred.

In accordance with this invention, between about 0.001 and 0.1 equivalents of unsaturated dicarboxylic acid are esterified with one equivalent of diol along with other dicarboxylic acids, where between 1.0 and 0.5 equivalents of total dicarboxylic acid are esterified with one equivalent of diol. On a weight basis, between about 0.1% and 5% of the dicarboxylic acid esterified consists of unsaturated dicarboxylic acid. The unsaturated dicarboxylic acid can be esterified simultaneously with the other esterifying reactants to produce a random polyester polymer containing very minor amounts of unsaturation. Alternatively, the unsaturated dicarboxylic acid can be esterified at the end of the polyester polymer reaction to produce polyester polymer terminated with a maleate half-ester group containing a double bond and a terminating carboxyl group. In either polyester polymer, the double bond is readily coreactive with ethylenically unsaturated monomers subsequently copolymerized in the presence of the unsaturated polyester and the epoxy resin.

In accordance with this invention, ethylenically unsaturated monomers including carboxyl monomers are copolymerized in the presence of epoxy resin mixed with polyester polymer containing very minor amounts of double bond unsaturation. Useful polymerizable ethylenically unsaturated monomers contain carbon-to-carbon unsaturation and include vinyl monomers, acrylic monomers, allylic monomers, acrylamide monomers, and mono carboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, divinyl benzene; vinyl aliphatic hydrocarbon monomers include alpha olefins such as ethylene, propylene, isobutylene, and cyclohexane as well as conjugated dienes such as 1,3 butadiene, methyl-2-butadiene, 1,3-piperylene, 2,3 dimethyl butadiene, isoprene, cyclohexane, cyclopentadiene, and dicylopentadiene; vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Useful ethylenic monomers further include N-alkylol amides including acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Minor amounts of functional monomers can be added, if desired, such as hydroxyl, amino, and amido functional groups containing monomers. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers.

Carboxyl functional monomers are particularly included and comprise acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid and similar acrylic acid and lower alkyl substituted acrylic acids wherein the preferred carboxylic monomers are acrylic and methacrylic acids.

On a weight basis of copolymerized monomers, the acrylic copolymer comprises between 20% and 100% carboxyl monomer, with the balance being other ethylenically unsaturated monomers. Preferred acrylic monomers suitable for grafting to the epoxy/polyester resin blend include carboxyl monomers, such as acrylic and methacrylic acid, and other ethylenic monomers such as the styrenics and the acrylate and methacrylate esters. Initiators such as benzoyl peroxide and t-butylperbenzoate are suitable at levels of about 0.5% to 10% based on acrylic monomers used.

The overall components of the acrylic grafted epoxy-polyester terpolymer range from about 5% to 80% epoxy resin, 1% to 70% polyester, and about 5% to 70% copolymerized ethylenic monomers, on a weight basis. Preferred compositions of the terpolymer contain 30% to 70% epoxy resin, 5% to 30% polyester, and 10% to 40% copolymerized ethylenic monomers. An additional minor amount of organic solvent such as hexyl cellosolve, butylcellosolve, or n-butanol can be used, if desired, to assist in processing.

In accordance with the process of this invention, polyester and epoxy resins are preformed. Preferably, the epoxy resin has a number average molecular weight between about 2000 and 10,000 while the polyester has a number average molecular weight between about 1,000 and 10,000. Number average molecular weights are typically measured by GPC according to ASTM methods such as D3536-76; D3593-80; or D3016-78. The epoxy and polyester grafted interpolymer can be produced by bulk or solvent in-situ polymerization of ethylenically unsaturated monomers with the epoxy and polyester resin and activated by peroxide or azo or other free radical initiator at polymerization temperatures typically between 130° C. to 180° C. and preferably between 140° C. to 160° C. Typically 0.5% to 10% peroxide initiator is utilized based on the weight of the monomers. Typical polymerization initiators can include for instance, benzoyl peroxide, t-butyl hydroperoxide, tertiary butyl perbenzoate, cumene peroxide and similar peroxide polymerization catalysts which are preferred. The monomers are copolymerized in the presence of the epoxy and polyester until the monomers are completely copolymerized. The resulting polymeric intergraft copolymer should have an Acid No. between about 30 and 120.

In accordance with this invention, the ethylenic monomers, including carboxyl monomers, are copolymerized with a mixture of the unsaturated polyester containing double bonds and the epoxy resin containing terminal oxirane groups. Alternatively, but less preferred, the ethylenic monomers can be first copolymerized with the polyester followed by esterification co-reaction with the epoxy resin.

To convert acid-functional reaction mixtures produced in accordance with the present invention to aqueous suspension, graft polymer is dispersed in deionized water, using a fugitive base (under curing conditions for the coating) such as primary, secondary, and tertiary alkyl, alkanol, and aromatic amines and alkanol-alkyl mixed amines; e.g., monoethanolamine, dimethylethanolamine, diethanolamine, triethylamine, dimethylaniline, ammonium hydroxide, or the like. Ordinarily this is done by simply adding the hot resin to a mixture of amine and water, which may be heated to aid in the dispersing process. Though the resin is typically well above the boiling point of water, careful addition of resins with good agitation will produce a good dispersion. Optionally amine can be added to the hot resin prior to dispersion into water, and, if desired, water can be then added to the amine resin mixture.

The amount of water in the final polymeric dispersion depends on the viscosity desired, which, in turn, is related to the method of application. For spraying or rollcoating application, a preferred aqueous polymeric dispersion can contain from 15% to 45% by weight of resin solids with about 55% to 85% of volatiles (amine base, water, and solvent). The amine base is usually from about 1% to 6%, water from about 30% to 90%, and the organic solvents, if any, from about zero to 10%.

The water dispersed carboxyl functional terpolymers of this invention can be thermoset by a coreactive crosslinking component adapted to coreact with the terpolymer carboxyl groups. For beer and beverage container coatings, the crosslinking agent is optional but desirable. Useful crosslinking agents include phenol formaldehyde resins, melamine formaldehyde resins, and benzoguanamine formaldehyde resins. Examples of useful aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. Examples of aminoplast resins are methylol urea, dimethoxymethylol urea, butylated polymeric urea-formaldehyde resins, hexamethoxymethyl melamine, methylated polymeric melamine-formaldehyde resin and butylated polymeric melamine-formaldehyde resin.

Phenolplast resins, or phenol-aldehyde resins, are the reaction products of phenols and aldehydes which contain reactive methylol groups. Examples of phenols which can be used to make these phenolplast resins are phenol, o, m, or p-cresol, 2,4-xylenol, 3,4-xylenol, 2,5-xylenol, cardanol, p-tert-butylphenol, and the like. Aldehydes useful in this invention are formaldehyde, acetaldehyde and propionaldehyde. Particularly useful phenolplast resins are polymethylol phenols wherein the phenolic group is etherified with an alkyl, e.g., methyl or ethyl, group.

In accordance with this invention, ethylenic monomers (including carboxyl monomers) are addition copolymerized with polyester containing double bonds and epoxy resin containing oxirane groups, where the three reactants are coreacted and grafted together to produce a carboxyl functional grafted terpolymer. The terpolymer carboxyl groups can be neutralized with amine and then dispersed into water. Phenol, melamine, and benzoguanamine formaldehyde resins can be added to the aqueous dispersion crosslinking cure purposes to provide a thermosetting composition. For beer and beverage container coatings, the crosslinking agent preferably comprise between 0 and 10%, but for other use can comprise between about 10% and 50%, and preferably between 20% and 40% of the total resin solids mixture comprising terpolymers and crosslinking agent. For food containers, the coating can be applied to a metal substrate and typically baked about 8 to 12 minutes at 380° F. to 420° F., but for beverage coatings 30 seconds to 2 minutes at 325° F. to 400° F. is typical.

EXAMPLES

For use as an interior coating of a beverage container, the process used in the following examples essentially was as follows: (1) preparing the polyester resin, and heating the polyester with a small amount of solvent to about 150° C.; (2) adding epoxy resin, such as Epon 1009 to form a polyester/epoxy blend (or alternately advancing liquid epoxy resin and bisphenol A to a molecular weight of over about 2000 and adding the preformed polyester to the advanced molecular weight epoxy; (3) adding a solution of initiator dissolved in monomers to the polyester/epoxy blend over about 1 hour at 150° C.; (4) inverting this grafted polymeric blend into water preheated to about 90° C., and which contains amine and/or ammonia to neutralize the acid groups, to render the polymeric blend dispersible in water. Alternately, amine can be added to the hot polymeric resin before inversion into water, or water could be added under pressure to the polymeric resin which contains amine in an inverse emulsification process.

EXAMPLE 1

Prepare a polyester from

| | |
|---|---|
| 377 g | ethylene glycol |
| 1011 g | sebacic acid |
| 0.5 g | butylstanoic acid |
| 10 g | fumaric acid |

The above components were heated to about 170° C. with a packed column under nitrogen with good agitation. The reaction temperature rose to a maximum of 230° C. as water was collected, but the column head temperature was kept at about 98 to 100° C. A xylene azeotroph was used to remove the last water, and the polyester was cooked to an acid value of about 2 mg KOH/g resin.

EXAMPLE 2

Prepare a second polyester as in Example 1 above from:

| | |
|---|---|
| 439 g | ethylene glycol |
| 498.6 g | isophthalic acid |
| 438.6 g | adipic acid |
| 10 g | fumaric acid |
| 0.5 g | butylstanoic acid |

EXAMPLE 3

Prepare an acrylic grafted epoxy/polyester composition as follows:

| | | |
|---|---|---|
| a) | 100 g | hexyl cellosolve |
| | 200 g | polyester from (1) above |
| | 500 g | Epon 1009 F (epoxy resin, Shell) |
| b) | 100 g | methacrylic acid |
| | 200 g | butyl acrylate |
| | 4.0 g | benzoyl peroxide |
| c) | 104 g | dimethylethanol amine |
| | 1000 g | water |
| d) | 1797 g | water |

The solvent and polyester of (a) were heated to about 150° C., and then the epoxy resin added to dissolve in the polyester; and held at 150° C. under nitrogen for ½ hour. Added (b) dropwise 1 hour to heated mixture (a) and held for ½ hour at 150° C. The water in (c) was heated to 90° C. and then the amine was added to the heated water. The grafted resin blend was added with high speed stirring to the heated water-amine mixture (c) over about 5 minutes, but controlling foaming. Continued to stir at high rpm for 30 minutes, then slowly added water (d) over 3-5 minutes. Cooled to room temperature.

EXAMPLE 4

Prepare a second acrylic grafted epoxy/polyester blend as in Example 3, but use the polyester from Example 2.

EXAMPLE 5

Prepare a third acrylic grafted epoxy/polyester blend as in Example 3, but use 100 g hexyl cellosolve, 350 g polyester from Example 1, and 350 g Epon 1009.

EXAMPLE 6

Prepare a polyester from the following:

| a) | 1256 g | terephthalic acid |
|---|---|---|
|  | 1206 g | ethylene glycol |
|  | 0.6 g | butylstanoic acid |
| b) | 42 g | fumaric acid |
|  | 280 g | adipic acid |
|  | 1256 g | isophthalic acid |

Components (a) were heated under nitrogen with a packed column to about 195° C. Water was removed with care to keep column head temperature at about 99° C. to 100° C. When all acid was dissolved, mixture (b) was added and continued to cook at 190-240° C. to an acid number of above 5.

EXAMPLE 7

Prepare an acrylic grafted polyester/epoxy with the polyester of Example 6:

| a) | 100 g | butylcellosolve |
|---|---|---|
|  | 100 g | hexylcellosolve |
|  | 200 g | polyester from Ex. 6 |
|  | 478 g | Epon 1009 |
| b) | 15 g | butyl acrylate |
|  | 183 g | styrene |
|  | 124 g | methacrylic acid |
|  | 1.7 g | t-butyl hydroperoxide |
|  | 6.6 g | benzoyl peroxide |
| c) | 128 g | dimethylethanol amine |
| d) | 1000 g | water at 90° C. |
| e) | 1672 g | water at 20° C. |

Solvent and polyester from (a) warmed to 150° C., and then added the epoxy. Heated mixture (a) was held at 150° under nitrogen and (b) was added dropwise over 1 hour. Held 20 minutes at 150° and added (c). After 10 minutes of mixing, this hot resin/amine mixture was poured into (d) with high agitation, stirred ½ hour, and then slowly added (e).

Films were drawn down with a #14 wire wound bar on aluminum and based at 200° C. for 2 minutes.

| | | Results | | | |
|---|---|---|---|---|---|
| Sample | 72 Hr. Settle | Viscosity* | Gloss | Texture | Blush** |
| 3 | none | 1160 cps | high | slight | none |
| 4 | <1/4 inch | 52 cps | high | smooth | none |
| 5 | none | 1700 cps | high | smooth | none |
| 7 | none | 285 cps | high | smooth | slight |
| 7A | none | 200 cps | high | smooth | none |

*Brookfield viscosity at 50 rpm, #5 spindle
**Water resistance (blush) was measured after immersed 30 minutes in 180° F. deionized water.

EXAMPLE 7A

An acrylic grafted polyester/epoxy was prepared as in Example 7, but 478 g Epon 1007 was used in place of the Epon 1009. The film tests showed comparable results.

GENERAL PROCESS

For food container coatings, preferred compositions and processing of the grafted epoxy terpolymer are as follows. Higher molecular weight epoxy resins are preferred and are coreacted with ethylenic monomers including carboxyl monomers and a slightly unsaturated polyester. The preferred compositions comprise by weight between 5% and 15% polyester where the most preferred polyester contains esterified isophthalic acid, terephthalic acid, sebacic acid, excess equivalents of butylene glycol and very minor amounts of trimethylolpropane. These reactants are completely reacted to an Acid No. below about 8 but with a hydroxyl number between about 25 and 60. An unsaturated dicarboxylic acid such as fumaric or maleic is then esterified with excess hydroxyl groups on the polyester to provide terminal double bond groups on the polyester. If maleic is used, a piperidine catalyst is preferably used to isomerize the maleic to fumaric which coreacts better with ethylenic monomers. The intent of reacting the dicarboxylic acid at the end of the polyester formation to is esterify with hydroxyl end groups to provide a more controlled structural polymer than would be obtained by random polymerization in the beginning with the rest of the reactants. Polyester with terminal double bond end groups provides unhindered addition polymerization with ethylenic monomer double bonds as well as provide excess terminal carboxyl groups for amination purposes and dispersion of the polymer into water. The preferred compositions are particularly desirable for interior food container coatings and exhibit excellent hydrolytic stability and flexibility.

The epoxy can be a high molecular weight resin, such as EPON 1009 or Dow DER 669, which is dissolved in solvent at about 140°-150° C. Alternately, the epoxy is advanced from the diglycidyl ether of bisphenol A and bisphenol A with a suitable catalyst (proprietary, supplied by Dow Chemical) in hexyl cellosolve solvent at 175° C. The advancement reaction is run at 83-85% non-volatile (NV) to a viscosity measured on the ICI Cone & Plate at 125° C. of 90-120 poise.

The polyester, reduced to about 75% NV in hexyl cellsolve, is added to a mixture of monomers, typically styrene, ethyl acrylate, and methacrylic acid. The acid monomer is in the range of 7-15% of the total composition. The monomers are added over 1-½ to 4 hours and held 1-2 hours for complete conversion at 150° C. The initiator is 2-7% t-butyl perbenzoate or benzoyl peroxide, although others may also be useful. Enough total solvent is used to bring the composition to 80-90% NV.

The polymer solution with acid functional acrylic grafted onto polyester and epoxy is added to a mixture of water and amine which are held at about 80-90° C. The final emulsion is about 35% to 40% NV, and the acid is neutralized from 50-100% by tertiary amine, such as dimethyl ethanolamine. Viscosity of the emulsion is between 100 and 50,000 centipoise.

This emulsion is formulated for cure by adding various phenolic resins, melamine-formaldehyde resins, and benzoguanamine-formaldehyde reins. Total crosslinking resin is in the range of 15% to 45%.

For food applications the coating is applied to sheets or coil stock by rollcoating. The coating is typically baked 8-12 minutes at 380°-420=F.

EXAMPLE 8

Preparation of polyester resin intermediate (for aqueous epoxy-graft-acrylic-graft polyester)

| Raw Material | Grams |
|---|---|
| 1,3-butylene glycol | 813.7 |
| isophthalic acid | 536.9 |
| terephthalic acid | 536.9 |
| sebacic acid | 324.2 |

| Raw Material | Grams |
|---|---|
| butyl stannoic acid | 2.7 |
| trimethylol propane | 66.96 |
| maleic anhydride | 1.5 |
| piperidine | 1.4 |

The 1,3-butylene glycol was placed in a flask fitted with a packed column and overhead condenser, agitator, nitrogen sparge, and a flask to collect glycol-water losses. After beginning the upheat of the butylene glycol, then the isophthalic acid, terephthalic acid, sebacic acid, butyl stannoic acid, and trimethol propane were added one after another. A typical polyester condensation reaction was carried out, with a maximum reaction temperature 230° C. When the temperature of the overhead thermometer read 90° C. the packed column was removed and the condensation reaction continued. When an acid number of 8 or less was reached, the resin was cooled to 90° C. and maleic anhydride and piperidine were added. The reaction temperature was increased to 150° C. and held for one hour. The nonvolatile content of the resin was 99% and the acid number was 6.7. The polyester resin was placed in hexyl cellosolve to yield a nonvolatile content of 73% and Gardner viscosity (Z-4) (Z-5) (58 poise, ICI Cone & Plate, 40 p cone, 30° C.).

EXAMPLE 9

Preparation of an aqueous epoxy-graft-acrylic-graft polyester.

| Raw Material | Grams |
|---|---|
| 1009 F epoxy resin | 1730 |
| hexyl cellosolve | 501.6 |
| polyester resin Ex. 8 | 370.7 |
| methacrylic acid | 247.1 |
| styrene | 247.1 |
| ethyl acrylate | 247.1 |
| tert-butyl perbenzoate | 50.4 |
| epoxy-acrylic-polyester resin | 2000 |
| deionized water | 2857 |
| dimethylethanolamine | 131.2 |

The hexyl cellosolve was placed in a flask equipped with a reflux condenser, an agitator, a heating mantle, and a nitrogen sparge. The hexyl cellosolve was heated to about 170° C. and epoxy resin was added and allowed to dissolve. The polyester resin was combined with methacrylic acid, styrene, ethyl acrylate, and tert-butyl perbenzoate to form a premix. This polyester monomer premix was added to the dissolved epoxy over three hours at 150° C. After all of the polyester monomer mix had been added, the batch temperature was maintained at 150° C. for another hour. The resulting epoxy-acrylic-polyester resin was poured with rapidly stirring 70° C. water which already contained dimethylethanol amine. The resulting emulsion was allowed to stir overnight before pouring it out. This emulsion had a nonvolatile content of 36% and a viscosity of 1620 cps (Brookfield, LVT, 25° C).

EXAMPLE 10

Preparation of an aqueous epoxy-graft-acrylic-graft polyester.

| Raw Material | Grams |
|---|---|
| 1009F epoxy resin | 1730 |
| hexyl cellosolve | 479.4 |
| polyester resin Ex. 8 | 165.06 |
| methacrylic acid | 197.7 |
| styrene | 271.8 |
| ethyl acrylate | 271.8 |
| tert-butyl perbenzoate | 50.4 |

The epoxy-acrylic-polyester resin and emulsion were prepared according to the procedure described in Example 1, except that (1) polyester-monomer mix was added over 3 hours, 20 minutes; and (2) the polyester was dissolved in styrene before the other monomers were added. The resulting emulsion was 36 NV and 1550 cops (Brookfield, LVT, 25° C.).

EXAMPLE 11

Preparation of an aqueous epoxy-graft-acrylic-graft polyester.

| Raw Material | Grams |
|---|---|
| 1009F epoxy resin | 1730 |
| hexyl cellosolve | 383.25 |
| polyester resin Ex. 8 | 247.1 |
| methacrylic acid | 247.1 |
| styrene | 247.1 |
| ethyl acrylate | 247.1 |
| tert-butyl perbenzoate | 50.4 |

The epoxy-acrylic-polyester resin and emulsion were prepared according to the procedure described in Example 2, except that polyester-monomer mix was added over four hours.

EXAMPLE 12

Formulation of epoxy-graft-acrylic-graft-polyester with phenolic resin and comparison of test results after food storage with an equivalent solvent borne formulation.

| | pphr | 4 months sauerkraut pack | 4 months dog food pack |
|---|---|---|---|
| Example 11 | 75 | slight blush | moderate stain |
| Uravar 75110 | 25 | | |
| Epon 1009 | 75 | slight to moderate blush | moderate stain |
| Uravar 75110 | 25 | | |

Uravar 75110 is an etherified phenolic resin supplied by DSM Resins, U.S.

The foregoing examples illustrate the merits of a polyester-epoxy grafted acrylic terpolymer and usefulness as a binder in coating compositions but are not intended to be limiting except by the appended claims.

We claim:

1. An aqueous dispersed, low VOC coating composition containing a polymeric binder dispersed in water comprising:
   an addition copolymer grafted epoxy-polyester terpolymer comprising by weight between about,
   (a) 1% and 70% unsaturated polyester having a number average molecular weight between about 200 and 20,000 and produced by esterifying dicarboxylic acid and diol where said dicarboxylic acid comprises 1% to 5% unsaturated dicarboxylic acid;

(b) 5% and 80% epoxy resin;
(c) 5% and 70% addition copolymer grafted to said polyester and said epoxy resin, said addition copolymer comprising copolymerized ethylenically unsaturated monomers where said monomers comprise between 20% and 100% carboxyl functional ethylenic monomers with the balance being other ethylenic monomers, where said monomers are copolymerized in the presence of the unsaturated polyester and the epoxy resin to produce the addition copolymer grafted epoxy-polyester having an Acid Number above about 30.

2. The coating composition of claim 1 where the copolymerized ethylenically unsaturated monomers comprise acrylic monomers and the terpolymer is an acrylic grafted epoxy-polyester terpolymer.

3. The coating composition of claim 1 where the terpolymer comprises by weight between about 5% and 30% unsaturated polyester, between about 30% and 70% epoxy resin, and between about 10% and 40% addition copolymer.

4. The coating composition of claim 1 where the unsaturated polyester is produced by esterifying 0.001 to 0.1 equivalents of unsaturated dicarboxylic acid with 1 equivalent of diol.

5. The coating composition of claim 1 where the terpolymer has an Acid Number between about 30 and 120 is dispersed into water by coreacting the terpolymer with an amine.

6. The coating composition of claim 1 where the coating is substantially free of volatile organic solvents.

7. The coating composition of claim 1 where the terpolymer has an Acid Number between about 30 and 120.

8. The coating composition of claim 1 where the unsaturated polyester has a molecular weight between 1,000 and 10,000.

9. The coating composition of claim 1 where the terpolymer is produced by mixing the unsaturated polyester with the epoxy resin followed by in-situ copolymerization of the ethylenic monomers to graft with the unsaturated polyester and epoxy resin.

10. The coating composition of claim 8 where the epoxy resin contains terminal oxirane groups and the carboxyl monomers esterify with the oxirane groups.

11. The coating composition of claim 8 where the ethylenic monomers copolymerized by addition polymerization with the unsaturated polyester.

* * * * *